No. 871,634.
PATENTED NOV. 19, 1907.
J. ROTHCHILD.
ENGINE.
APPLICATION FILED JAN. 31, 1907.
2 SHEETS—SHEET 1.
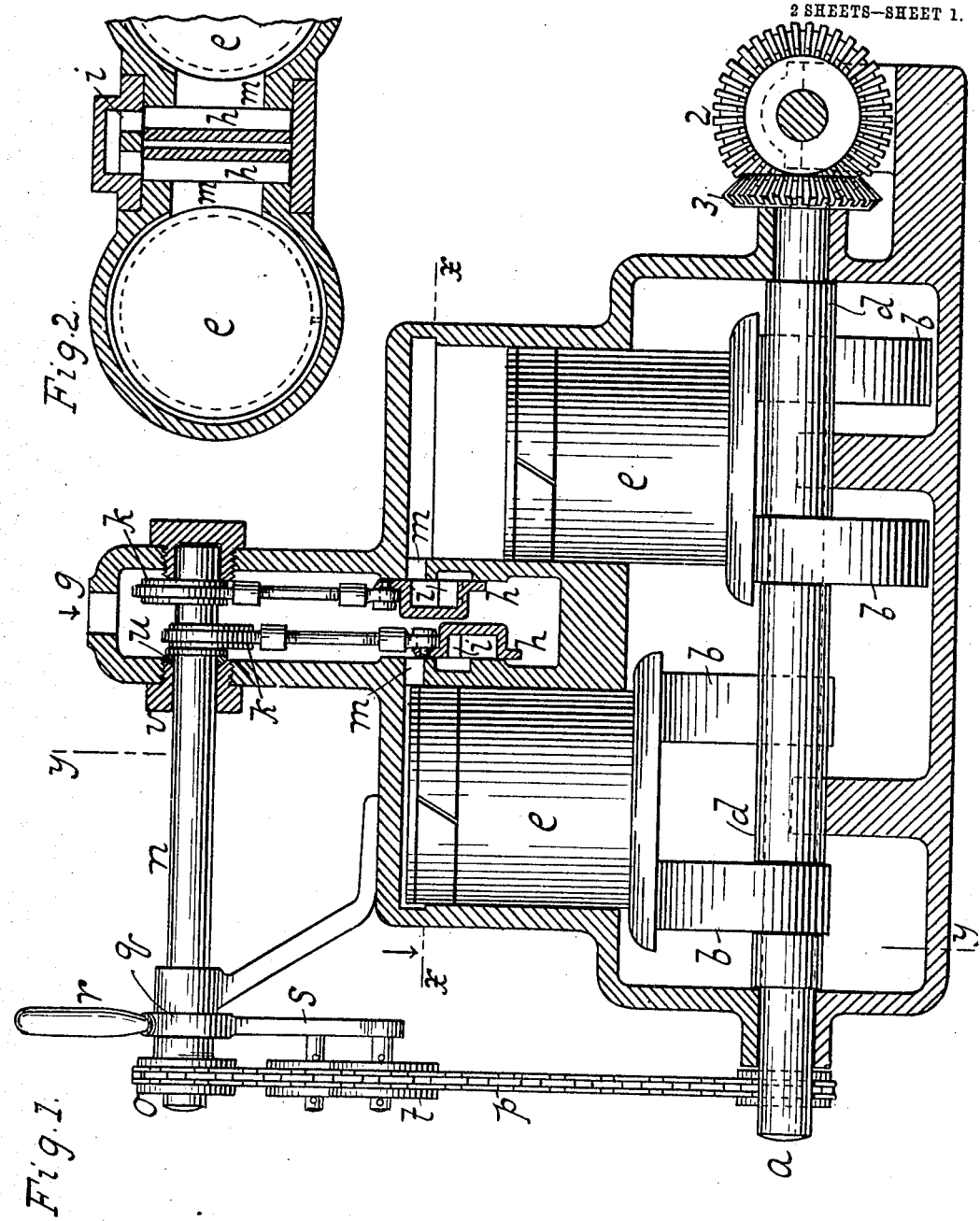
WITNESSES:
William Miller
Edward Wiesner
INVENTOR
Joseph Rothchild
BY
W. C. Hauff
ATTORNEY No. 871,634.
PATENTED NOV. 19, 1907.
J. ROTHCHILD.
ENGINE.
APPLICATION FILED JAN. 31, 1907.
2 SHEETS—SHEET 2.
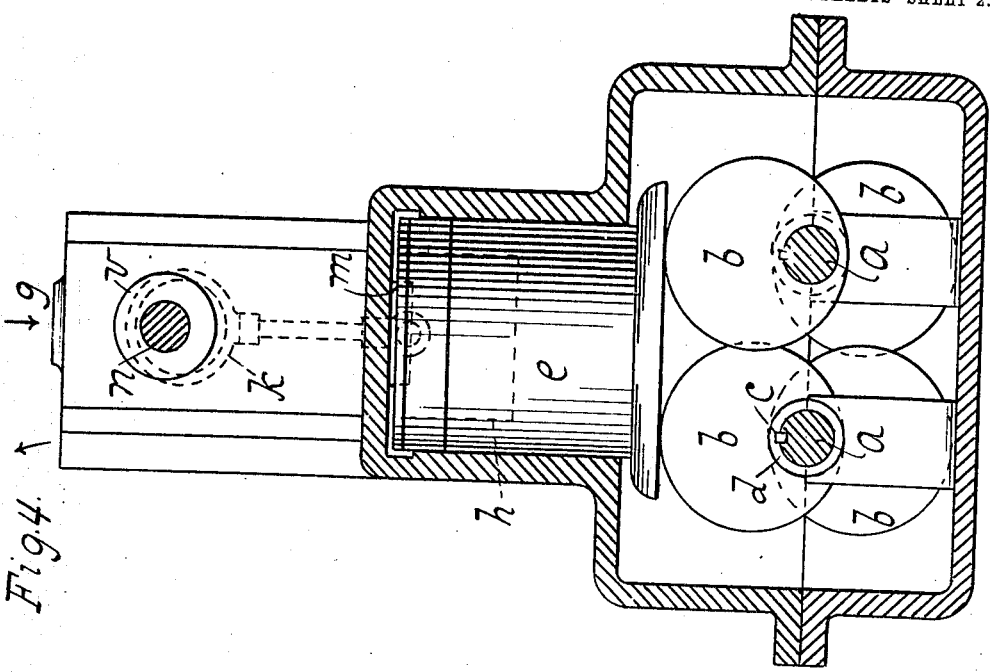
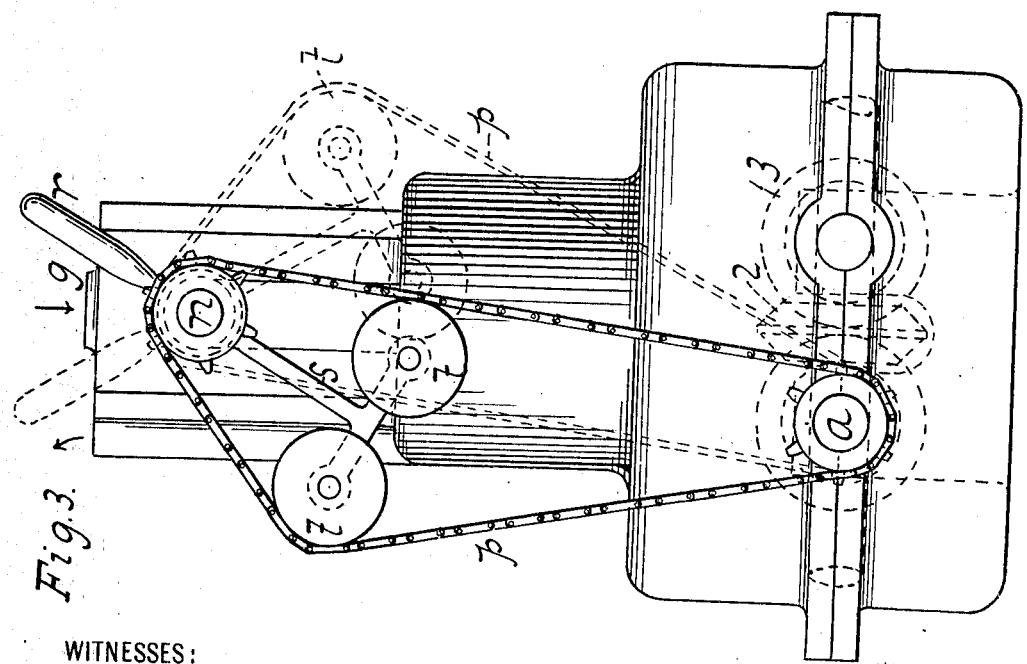
WITNESSES:
William J. Miller
Edward Wiesner
INVENTOR
Joseph Rothchild
BY
W. C. Hauff
ATTORNEY

UNITED STATES PATENT OFFICE.

JOSEPH ROTHCHILD, OF BROOKLYN, NEW YORK, ASSIGNOR OF TWO-FIFTHS TO ROBERT BUCHANAN, OF BROOKLYN, NEW YORK, ONE-FIFTH TO ROBERT H. BURNS, OF QUEENS, NEW YORK, AND TWO-FIFTHS TO PIERRE P. PULLIS, OF BROOKLYN, NEW YORK.

ENGINE.

No. 871,634.      Specification of Letters Patent.      Patented Nov. 19, 1907.

Application filed January 31, 1907. Serial No. 355,062.

*To all whom it may concern:*

Be it known that I, JOSEPH ROTHCHILD, a citizen of the United States, residing at Brooklyn, in the county of Kings and State of New York, have invented new and useful Improvements in Engines, of which the following is a specification.

This invention relates to certain features of construction set forth in the following specification and claim and illustrated in the annexed drawing, in which:

Figure 1 is a longitudinal sectional elevation of an engine embodying this invention. Fig. 2 is a section along $xx$ Fig. 1. Fig. 3 is a front elevation of Fig. 1. Fig. 4 is a section along $yy$ Fig. 1.

In this drawing are shown two shafts $a$ to each of which are keyed cams or eccentrics $b$. The keys are shown at $c$ and the spacers $d$ between the cams keep the latter apart and also prevent the keys from coming out of place.

The working pressure entering at $g$ is caused to alternately press or move the piston $e$. The slide valves $h$ in connection with parts $i$ and $m$ are applied in suitable way. The valves are actuated by eccentrics $k$ and shaft $n$ rotated by sprocket wheel $o$ and chain $p$ receiving motion from a shaft $a$.

On the shaft $n$ is a loose collar $q$ with handle $r$ and arm $s$ carrying guide pulleys $t$. If the handle is moved for example as indicated by full, and dotted lines in Fig. 3 the slack of the chain is shifted and the shaft $n$ rotated so far or the relation of shafts $a$ and $n$ sufficiently changed to reverse or shift the valves for the engine to run the other way.

The slide valves and their stems and eccentrics $k$ as seen are contained in the steam chest an advantage of which is that the valve stem does not have to be extended through any stuffing box nor does the construction require the joint heretofore needed by the stem passing through a stuffing box and bearing. It may also be noted that an advantage of the construction is that the eccentrics $k$ when in the steam chest are self lubricating being supplied with oil entering in connection with the steam.

As seen steam enters each cylinder at only one end or point so that in the adjustment of each valve the setting is simplified as the adjustment of the valve need to be made with regard to only one end or point instead of two as heretofore.

The shaft $n$ at the point where it enters the steam chest is provided with a ring $u$ seated against a flange on the shaft and having the opposite side or beveled face pressing or seated against a corresponding surface on a bushing or bearing $v$ in a wall of the steam chest.

Each piston $e$ is shown with an extended or flanged base resting upon two cams. As these cams rotate in opposite directions the piston or its base is given a rotating or swiveling motion as well as having a reciprocating motion or a stroke toward the shafts and return.

The shafts $a$ are shown connected by a uniting gear 2 engaging or connecting the gears 3 or shafts $a$. By uniting the shafts the pistons are maintained at the proper plane and the parts work in required sequence.

The assembling of the parts can be accomplished by keying one cam to its place on the shaft, slipping a spacer onto the shaft to such cam or key, then keying the next cam to its place on the shaft and so on.

The pistons are shown each with its cams equidistant from the axis of said piston.

It may be noted that no cross head nor like slipping connection is employed but that each piston acts directly upon or contacts directly with its cam or with a revolving contact. Friction or slipping are thus reduced to a minimum.

The piston is rotated without its head or inner ends being in contact with any part of the cylinder, but merely exposed to the pressure of the working medium so that the piston rotates or swivels freely or without excessive friction or practically without friction.

In engines where there is a crank movement the working pressure must be momentary and must be accurately timed in order to be effectively utilized. In the above device however as explained a premature working pressure will not retard the running of the parts.

Now what I claim is:

An engine having a piston and shafts located eccentrically to the axis of the piston and having cams fixed thereto, said piston and cams being made to act or contact directly one upon the other to avoid employment of any slipping or other friction connection and driving or uniting gears connected to and made to directly actuate each shaft.

In testimony whereof I have hereunto set my hand in the presence of two subscribing witnesses.

JOSEPH ROTHCHILD.

Witnesses:
 EDWARD WIESNER,
 CHRISTIAN ALMSTEAD.